(12) United States Patent
Zhou et al.

(10) Patent No.: US 7,599,285 B2
(45) Date of Patent: Oct. 6, 2009

(54) COMBINED ELECTRO-MECHANICAL AND SOLID STATE SWITCHING FABRIC

(75) Inventors: Jiahuai Zhou, San Mateo, CA (US); Rick Meller, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1029 days.

(21) Appl. No.: 10/701,405

(22) Filed: Nov. 3, 2003

(65) Prior Publication Data
US 2005/0094553 A1 May 5, 2005

(51) Int. Cl.
*H04J 1/16* (2006.01)
*H04J 3/14* (2006.01)

(52) U.S. Cl. .............. 370/217; 370/218; 370/220; 370/221; 370/225

(58) Field of Classification Search .......... 370/217, 370/218–220, 221, 225
See application file for complete search history.

(56) References Cited

U.S. PATENT DOCUMENTS

| | | | | |
|---|---|---|---|---|
| 4,833,708 | A | 5/1989 | Goodrich | 379/327 |
| 6,539,027 | B1 | 3/2003 | Cambron | 370/442 |
| 6,546,017 | B1 * | 4/2003 | Khaunte | 370/412 |
| 6,856,600 | B1 * | 2/2005 | Russell et al. | 370/244 |
| 6,879,559 | B1 * | 4/2005 | Blackmon et al. | 370/225 |
| 6,910,148 | B1 * | 6/2005 | Ho et al. | 714/4 |
| 6,922,323 | B1 * | 7/2005 | Bentley | 361/119 |
| 6,999,468 | B2 * | 2/2006 | Lund et al. | 370/458 |
| 7,068,712 | B1 * | 6/2006 | Zang et al. | 375/222 |
| 2002/0136203 | A1 * | 9/2002 | Liva et al. | 370/352 |
| 2002/0179720 | A1 | 12/2002 | Valentino et al. | 714/9 |
| 2006/0251097 | A1 * | 11/2006 | Chapman et al. | 370/431 |

OTHER PUBLICATIONS

Int'l Search Report for PCT Application No. PCT/US2004/036289, mailed Feb. 15, 2005.
Int'l Written Opinion for PCT Application No. PCT/US2004/036289, mailed Feb. 15, 2005.
Weinschel Corporation, SmartStep Application Specific Subsystems, "Application Specific Subsystems", Oct. 6, 2003, downloaded from http://web.archive.org/web/20031024171352/www.weinschel.com/Smartstep_capa.htm, 4 pages.
Motorola, "Broadband Services Router 64000 BSR 64000—Cable modem Termination System and Router" www.motorola.com/broadband 2003.
European Search Report Application No. 04796873.0, dated Jun. 19, 2007.
Chinese Office Action dated Apr. 4, 2008, for Application No. 200480032320.X.
Examination Report received from the Canadian International PTO dated Sep. 24, 2008, Application No. 2,543,194.

* cited by examiner

*Primary Examiner*—Chi H Pham
*Assistant Examiner*—Farah Faroul
(74) *Attorney, Agent, or Firm*—Weaver Austin Villeneuve & Sampson LLP

(57) ABSTRACT

According to the present invention, methods and apparatus are provided to allow efficient switching of cable lines from failed line cards to protect line cards. Line cards may be arranged in multiple protect and active groups supporting both upstream and downstream transmission frequencies. A combined electromechanical and solid state switching fabric is provided to efficiently allow reassignment of cable lines to line cards.

27 Claims, 8 Drawing Sheets

COMBINED ELECTRO-MECHANICAL AND SOLID STATE SWITCHING FABRIC

BACKGROUND OF THE INVENTION

1. Field of the Invention

The present invention generally relates to network switching. More specifically, the present invention provides techniques for effectively and efficiently switching cable lines to available active line cards.

2. Description of Related Art

A cable network headend such as a cable modem termination system typically includes multiple line cards connected to various cable lines. The cable lines may be coaxial cable lines or fibre optic lines connected to cable plants and cable networks. Since a variety of reasons can cause line card failure, mechanisms are often provided to support high availability and redundancy by providing redundant line cards.

In some examples, protect line cards are provided along with active line cards. For example, there may be one protect line card associated with five active line cards. If an active line card connected to a cable line fails, the cable line is switched over onto a protect line card. However, hardware mechanisms for switching the cable line over from a failed line card to a protect line card are limited. In many instances, the hardware switching mechanisms cause loss and inefficiency during both switchover and normal operation. Examples are the Weinschel external RF switch available from Weinschel Corporation of Frederick, Md. and the Motorola and Arris internal RF switches available from Motorola Corporation of Schaumburg, Ill. and Arris Corporation of Wayne, Pa., respectively. The available switches only support N+1 redundancy and require two separate cards for supporting upstream and downstream applications. Furthermore, the switches also require a 3 dB splitter or low isolation components which cause the DS signal quality to degrade.

Consequently, it is desirable to provide techniques for improving the mechanisms for providing redundancy in cable network headends.

SUMMARY OF THE INVENTION

According to the present invention, methods and apparatus are provided to allow efficient switching of cable lines from failed line cards to protect line cards. Line cards may be arranged in multiple protect and active groups supporting both upstream and downstream transmission frequencies. The techniques of the present invention use electromechanical relay and solid state switch technologies to enable a high number of multiple redundant groupings.

According to various embodiments, the techniques of the present invention do not require the use of passive splitters and thus eliminate the additional insertion loss of those splitters while meeting channel to channel isolation in excess of 60 dB. The techniques and mechanisms also do not require the disabling of the downstream up-converters due to the isolation of the electromechanical relay thus eliminating the potential for co-channel interference during failsafe switchover.

In one embodiment, a redundant cable network headend is provided. The cable network headend includes a pass module and a switch module. The pass module is coupled to a plurality of active line cards and a plurality of active cable network ports. The pass module is configured to connect the plurality of active line cards to the plurality of active cable network ports through a plurality of pass module electromechanical switches. The switch modules comprises a plurality of switch module electromechanical switches and a solid state switching mechanism. The switch module is associated with control circuitry and coupled to the pass module. Control circuitry responds to line card failure information by switching one of the plurality of active cable network ports to a redundant line card through the pass module.

In another embodiment, a method for supporting redundancy at a cable network headend is provided. A plurality of active line cards are coupled to a plurality of active cable network ports through a plurality of electromechanical switches at a cable network headend. Monitoring for failure of one of the plurality of active line cards is conducted. One of the plurality of active cable network ports is switched to a protect line card when failure is detected. One of the plurality of active cable network ports is switched to the protect line card through electromechanical switches and a solid state switching mechanism.

A further understanding of the nature and advantages of the present invention may be realized by reference to the remaining portions of the specification and the drawings.

BRIEF DESCRIPTION OF THE DRAWINGS

The invention may best be understood by reference to the following description taken in conjunction with the accompanying drawings, which are illustrative of specific embodiments of the present invention.

DETAILED DESCRIPTION OF SPECIFIC EMBODIMENTS

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

Figure 1:
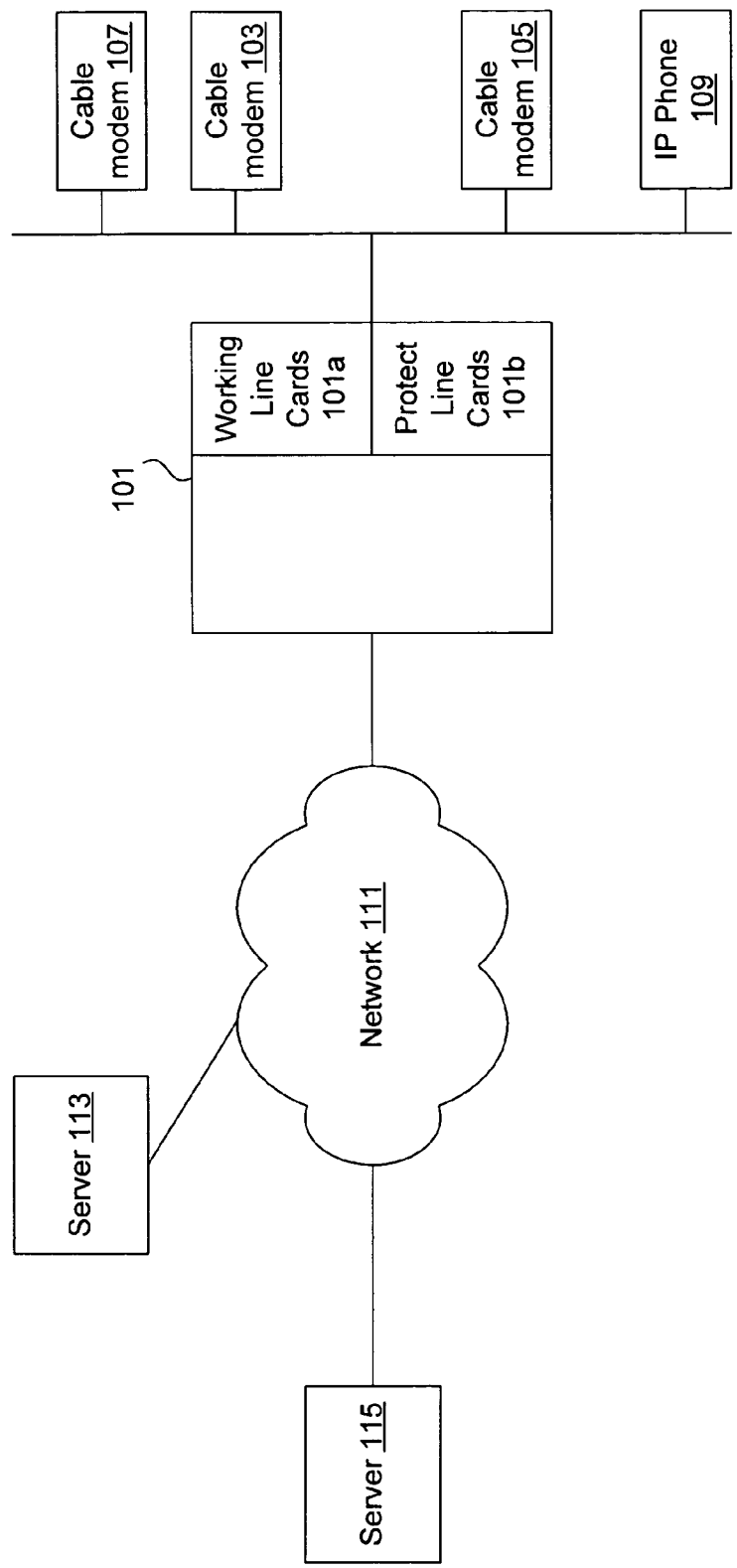
FIG. 1 is a diagrammatic representation of a system that can use the techniques of the present invention.

FIG. 1 is a diagrammatic representation of a system in which the techniques of the present invention can be used. Although FIG. 1 will be used to describe the present invention in the context of cable modems, it should be noted that the techniques of the present invention are general and can be applied in a variety of contexts. A cable network headend 101 couples various devices including cable modems 103, 105, and 107 and IP phone 109 to a network 111. Any line such as a coaxial line or a fibre optic line coupling cable devices to a network is referred to herein as a cable line. Through network 111, the various devices can access server 113 and server 115. In one example, network 111 is the Internet. Cable network headend 101 includes active line cards 101a and redundant line cards 101b. Cable network headend 101 may contain other components some of which may have backup components while some others have standalone components. The active line cards 101a include functionality to allow various devices 103-109 to communicate with servers 113 and 115.

The line cards 101a, for example, are involved with handling power and frequency ranges for various cable network devices. In many instances, the cable network headend 101 monitors the status of active line cards 101a and tracks the availability of protect line cards 101b.

Figure 2:
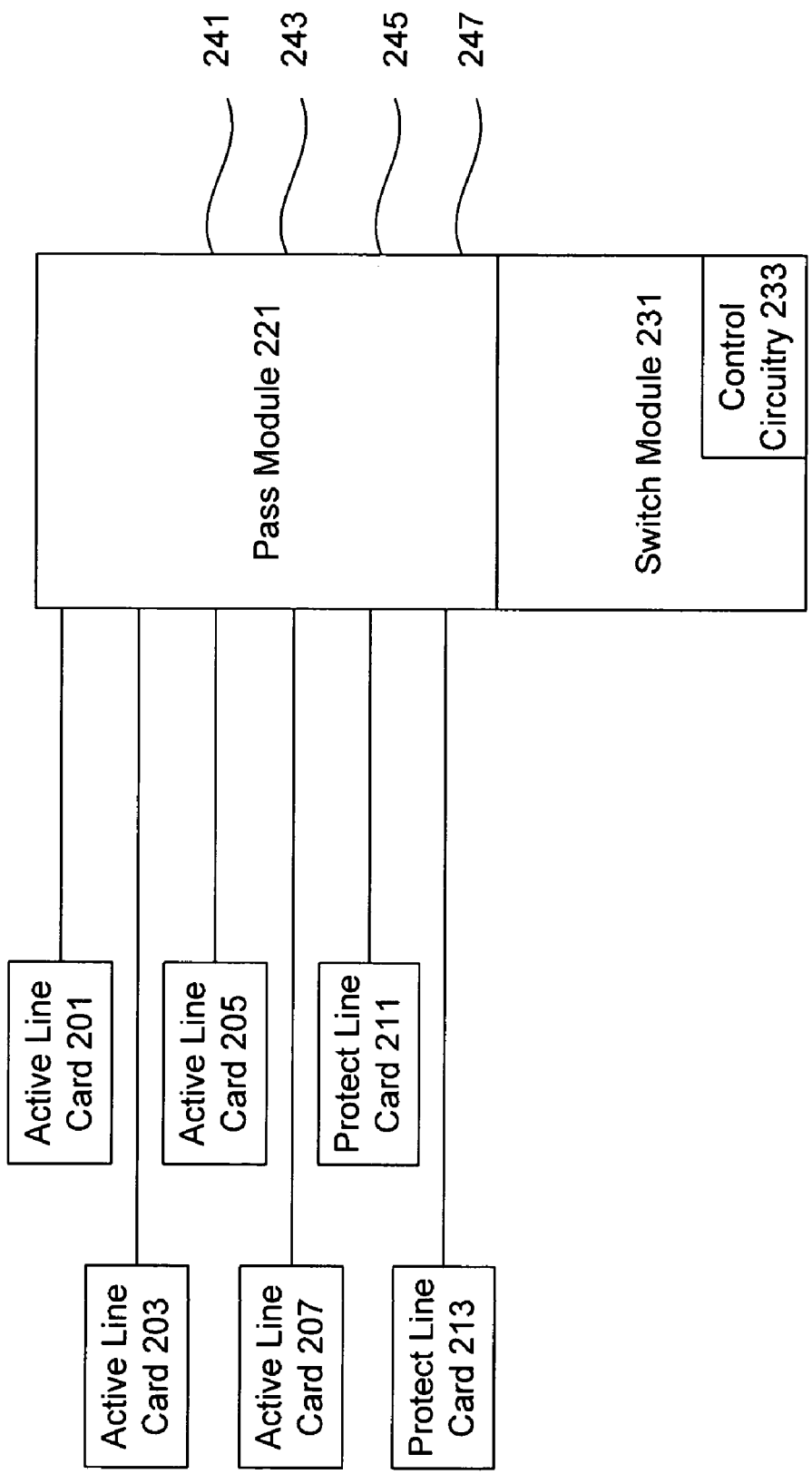
FIG. 2 is diagrammatic representation showing a redundant cable modem termination system switch architecture.

FIG. 2 is a diagrammatic representation of a line card redundancy module. Any mechanism for connecting cable lines to active line cards and protect line cards is referred to herein as a line card redundancy module. According to various embodiments, the line card redundancy module is associated with a cable modem termination system. The line card redundancy module may be part of the cable modem termination system or may be a separate entity entirely. In some examples, the line card redundancy module includes a pass module 221 and a switch module 231. The pass module 221 couples line cards to cable lines.

According to various embodiments, mechanisms are provided in the line card redundancy module to allow a substantial reduction in signal loss and distortion. By reducing signal loss and distortion, power can be conserved and in many cases active line cards can be nearly directly connected to cable lines. The line card redundancy module may also include the switch module. In many examples, the switch module 231 includes functionality to connect cable lines to redundant line cards or protect line cards upon the failure of an active line card. The switch module 231 can be associated with control circuitry 233 that signals individual mechanisms within the pass module and the switch module to reroute data lines. Switch module 231 may be in contact with a cable network headend operating system. The cable network headend operating system tracks the availability of protect line cards as well as the failure of active line cards.

It should be noted, that although the pass module 221 and the switch module 231 are shown as separate entities within a line card redundancy module, the mechanisms and functionality of the two modules may be arranged in a variety of different manners. In some examples, the pass module and the switch module may be a single entity. In other examples, the modules may further be subdivided into additional modules. A variety of arrangements will be appreciated by one of skill in the art.

Figure 3:
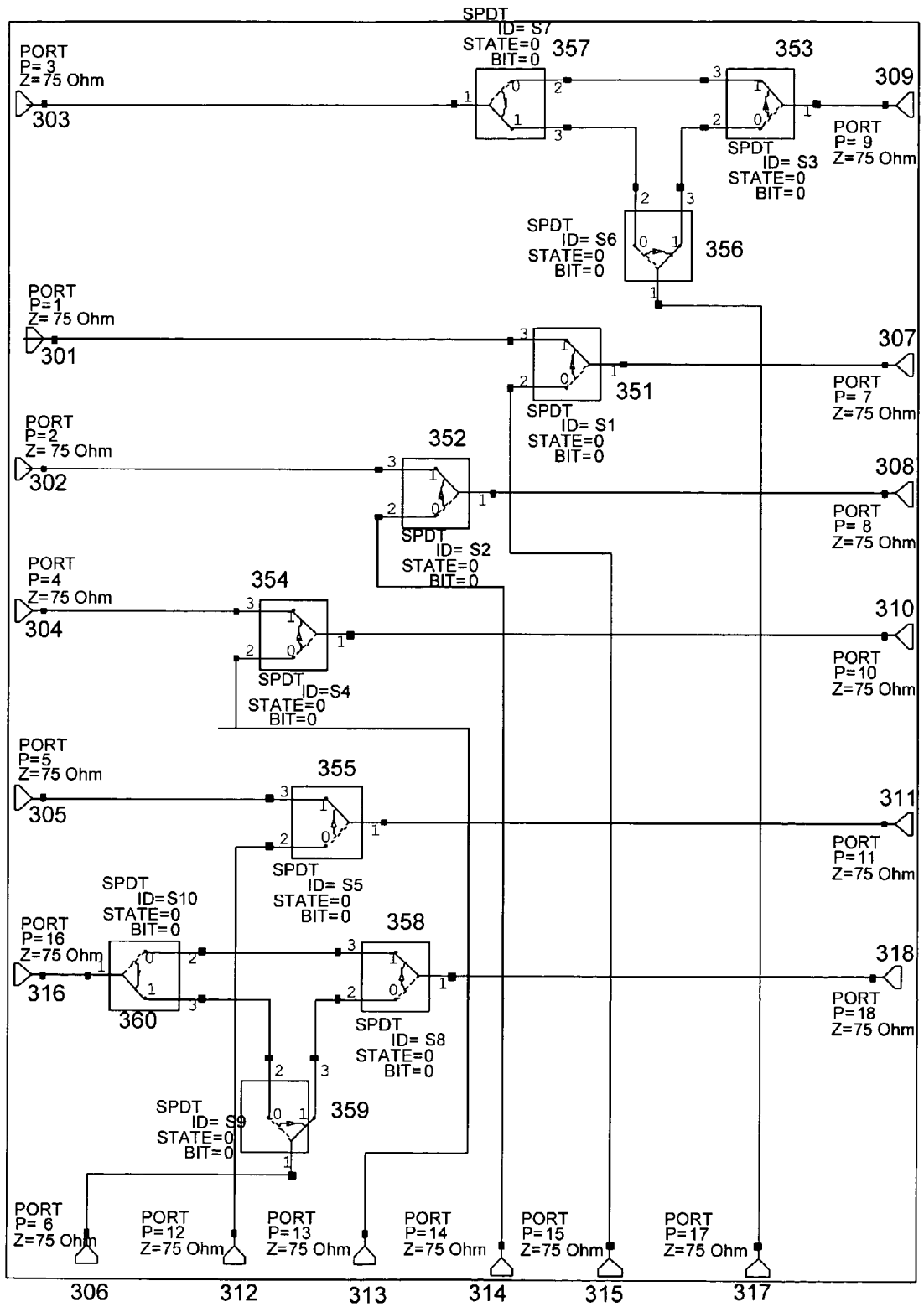
FIG. 3 is a diagrammatic representation depicting a pass module.

FIG. 3 is a diagrammatic representation of one example of a pass module. In this example, six line cards are supported with up to two line cards operable as redundant line cards. The six line cards can be connected to line card interfaces 301, 302, 303, 304, 305, and 316. Up to six cable lines can be supported. If all six line cards are active, six cable lines can be connected through cable line interfaces 307, 308, 309, 310, 311, and 318. However, if only four line cards are active, and line cards associated with interfaces 303 and 316 are two redundant linecards, cable lines can be connected through ports 307, 308, 310, and 311. Interfaces to the switch module are also provided through ports 306, and 312-317. A variety of electromechanical switches are included in the pass module to allow substantially lossless transmission between cable lines and line cards. Any switch that allows substantially lossless transmission of RF signals between separate systems is referred to herein as an electromechanical switch.

This contrasts with solid state switches, splitters, or other devices that either cause substantial loss or lack adequate RF isolation during simultaneous transmissions. In one example, the electromechanical switches are relays that allow nearly metal to metal contact between cable lines and line cards for low loss and high isolation. According to various embodiments, relays 351-360 are used to interconnect line cards and cable lines. Individual relays such as relay 351 has a connection node 1 coupled to a cable line. The relay can be switched to either allow connection of the cable line interface 307 to node 3 and the line card interface 301, or to node 2 and the interface to the switch module 315.

Figure 4:
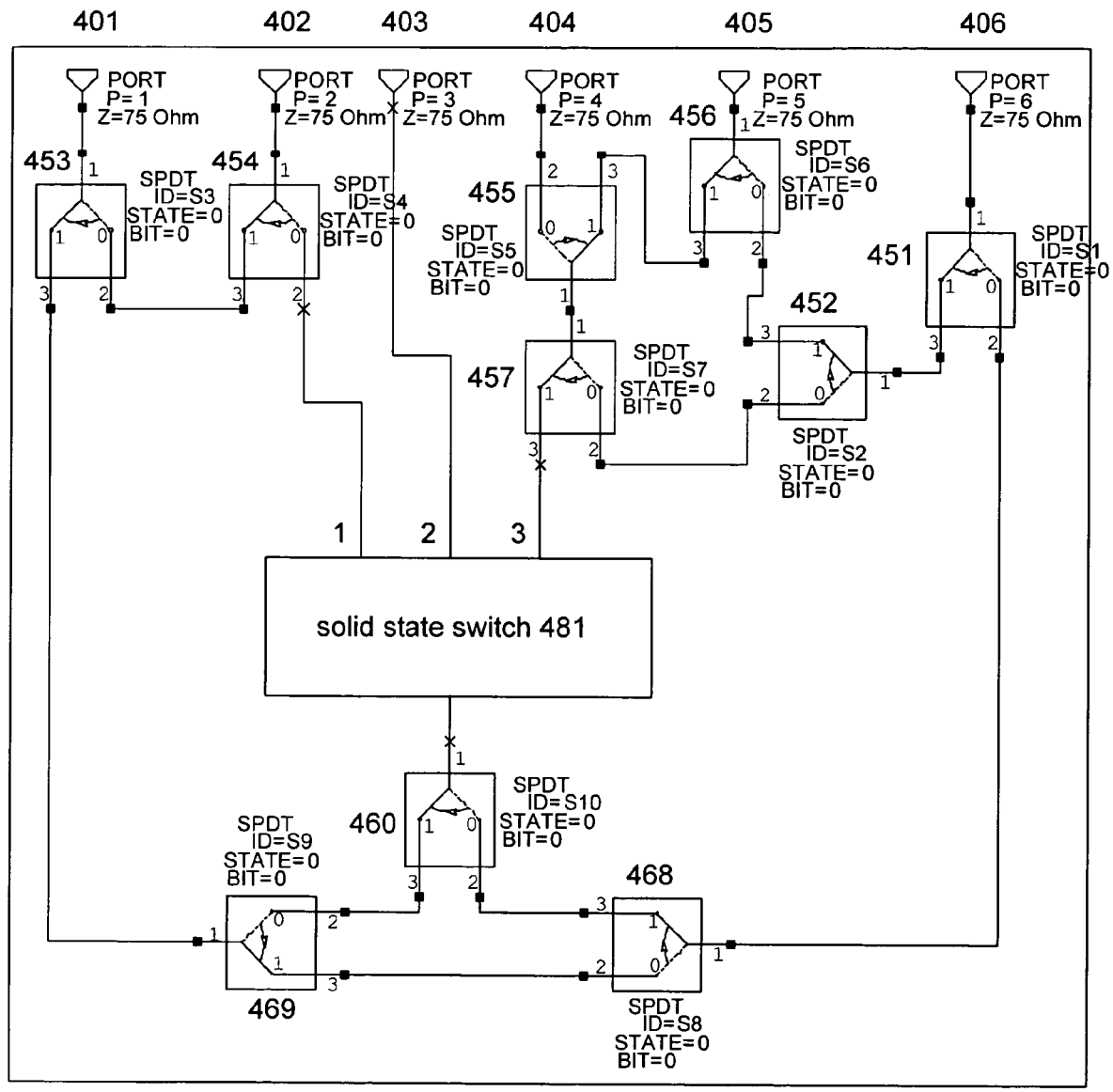
FIG. 4 is a diagrammatic representation showing a switch module.

FIG. 4 is a diagrammatic representation of a switch module coupled to the pass module of FIG. 3. Interfaces 401 through 406 allow connection the switch module to the pass module. The switch module includes relays 451 through 457, 460, and 468-469 to allow a cable line to be switched from a failed line card to a redundant line card. Although the switch module can be implemented entirely using relays, a substantial number of relatively large relays would have to be used. Consequently, the techniques and mechanisms of the present invention recognize that a solid state switch 481 used once can be combined with relays to allow still relatively lossless transmission and high isolation while maintaining flexibility and scalability. The solid state switch 481 allows RF signals to be directed toward particular ports. Although the solid state switch 481 may introduce some distortion, only minimum distortion is introduced as only a single solid state switch 481 is used for any given path between a cable line and a line card.

Figure 5:
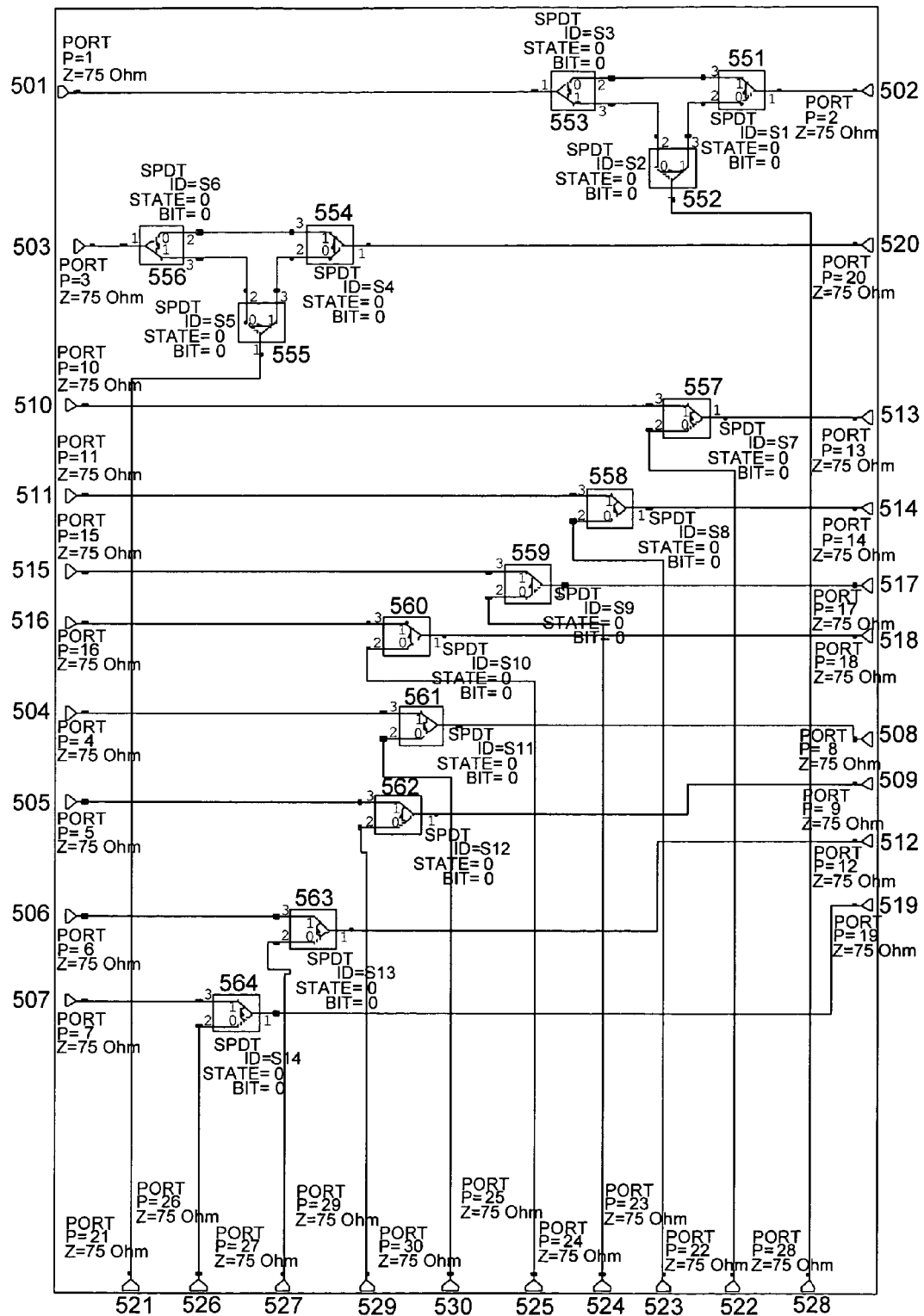
FIG. 5 is diagrammatic representation depicting a pass module having 10 line cards.

FIG. 5 is a diagrammatic representation of one example of a pass module. In this example, ten line cards are supported with up to two line cards operable as redundant line cards. The ten line cards can be connected to line card interfaces 501, 503, 504, 505, 506, 507, 510, 511, 515, and 516. Up to ten cable lines can also be supported. If all ten line cards are active, ten cable lines can be connected through cable line interfaces 502, 508, 509, 512, 513, 514, 517, 518, 519, and 520. However, if only eight line cards are active, and two line cards associated with interfaces 501 and 503 a redundant, cable lines can be connected through ports 513, 514, 517, 518, 508, 509, 512, and 519. Interfaces to the switch module are also provided through ports 521-530.

A variety of electromechanical switches are included in the pass module to allow substantially lossless transmission between cable lines and line cards while maintaining high isolation between different signal paths. In one example, the electro mechanical switches are relays that allow nearly metal to metal contact between cable lines and line cards. According to various embodiments, relays 551-564 are used to interconnect line cards and cable lines. Individual relays such as relay 557 has a connection node 1 coupled to a cable line. The relay can be switched to either allow connection of the cable line interface 510 to the line card interface 501, or to node 2 and the switch module interface 522.

Each individual relay is toggled depending on the status of various line cards. For example, relay 557 is toggled to the 3 position (connecting node 1 and interface 513 to node 3 and interface 510 when a line card associated with interface 510 is available). However, if the line card associated with interface 510 becomes unavailable, the relay 557 is toggled to the 2 position (connecting interface 513 to interface 522 and the switch module). The cable line is rerouted from the failed line card to a protect line card through the switch module. In some instances, one line card may be used to protect 9 line cards. That is, if any of the 9 line cards fail, the protect line card takes over. This configuration is referred to herein as the 1P+9 configuration. However, the techniques of the present invention allow other arrangements or line card groupings as well. In some examples, line cards may be grouped by service. In other examples, the line cards are grouped by priority. For example, a redundant line card may be arranged to protect 7 line cards while another redundant line card protects one particularly important DOCSIS service flow mapped line card. This configuration is referred to herein as 1P+7, 2P+1. In still another example, the first redundant line card may be arranged to protect three line cards while a second redundant line card may be arranged to protect 5 cards. This configuration is referred to herein as 1P+3, 2P+5. The following table shows various redundant line card groupings as well as the switch positions based upon the availability or unavailability of particular line cards.

TABLE 1

Relay Positions For Pass Module

Abbreviations: Card = C, Working = W, Failed = F
(e.g. C2W3, C2F2 means Card 2 Working: Node 3 Connected, Card 2 Failed: Node 2 Connected)

| Switch Module | Sw 551 | Sw 552 | Sw 553 | Sw 554 | Sw 555 | Sw 556 | Sw 557 | Sw 558 | Sw 559 | Sw 560 | Sw 561 | Sw 562 | Sw 563 | Sw 564 |
|---|---|---|---|---|---|---|---|---|---|---|---|---|---|---|
| Redundant group 10 working cards | | | | | | | | | | | | | | |
| 1P + 9, | 3 | 2 | 3 | C2W3 C2F2 | 3 | 2 | C3W3 C3F2 | C4W3 C4F2 | C5W3 C5F2 | C6W3 C6F2 | C7W3 C7F2 | C8W3 C8F2 | C9W3 C9F2 | C10W3 C10F2 |
| 1P + 8, 2W | 3 | 2 | 3 | 3 | 3 | 2 | C3W3 C3F2 | C4W3 C4F2 | C5W3 C5F2 | C6W3 C6F2 | C7W3 C7F2 | C8W3 C8F2 | C9W3 C9F2 | C10W3 C10F2 |
| 1P + 7, 2P + 1 | 3 | 2 | 3 | 3 | 2 | 3 | C3W3 C3F2 | C4W3 C4F2 | C5W3 C5F2 | C6W3 C6F2 | C7W3 C7F2 | C8W3 C8F2 | C9W3 C9F2 | C10W3 C10F2 |
| 1P + 6, 2P + 2 | 3 | 2 | 3 | 3 | 2 | 3 | C3W3 C3F2 | C4W3 C4F2 | C5W3 C5F2 | C6W3 C6F2 | C7W3 C7F2 | C8W3 C8F2 | C9W3 C9F2 | C10W3 C10F2 |
| 1P + 5, 2P + 3 | 3 | 2 | 3 | 3 | 2 | 3 | C3W3 C3F2 | C4W3 C4F2 | C5W3 C5F2 | C6W3 C6F2 | C7W3 C7F2 | C8W3 C8F2 | C9W3 C9F2 | C10W3 C10F2 |
| 1P + 4, 2P + 4 | 3 | 2 | 3 | 3 | 2 | 3 | C3W3 C3F2 | C4W3 C4F2 | C5W3 C5F2 | C6W3 C6F2 | C7W3 C7F2 | C8W3 C8F2 | C9W3 C9F2 | C10W3 C10F2 |
| 1P + 3, 2P + 5 | 3 | 2 | 3 | 3 | 2 | 3 | C3W3 C3F2 | C4W3 C4F2 | C5W3 C5F2 | C6W3 C6F2 | C7W3 C7F2 | C8W3 C8F2 | C9W3 C9F2 | C10W3 C10F2 |
| 1P + 2, 2P + 6 | 3 | 2 | 3 | 3 | 2 | 3 | C3W3 C3F2 | C4W3 C4F2 | C5W3 C5F2 | C6W3 C6F2 | C7W3 C7F2 | C8W3 C8F2 | C9W3 C9F2 | C10W3 C10F2 |
| 1P + 1, 2P + 7 | 3 | 2 | 3 | 3 | 2 | 3 | C3W3 C3F2 | C4W3 C4F2 | C5W3 C5F2 | C6W3 C6F2 | C7W3 C7F2 | C8W3 C8F2 | C9W3 C9F2 | C10W3 C10F2 |
| 1W, 2P + 8 | 3 | 3 | 2 | 3 | 2 | 3 | C3W3 C3F2 | C4W3 C4F2 | C5W3 C5F2 | C6W3 C6F2 | C7W3 C7F2 | C8W3 C8F2 | C9W3 C9F2 | C10W3 C10F2 |
| 2P + 9 | 3 | 2 | C1W2 C1F3 | 3 | 2 | 3 | C3W3 C3F2 | C4W3 C4F2 | C5W3 C5F2 | C6W3 C6F2 | C7W3 C7F2 | C8W3 C8F2 | C9W3 C9F2 | C10W3 C10F2 |

Figure 6:
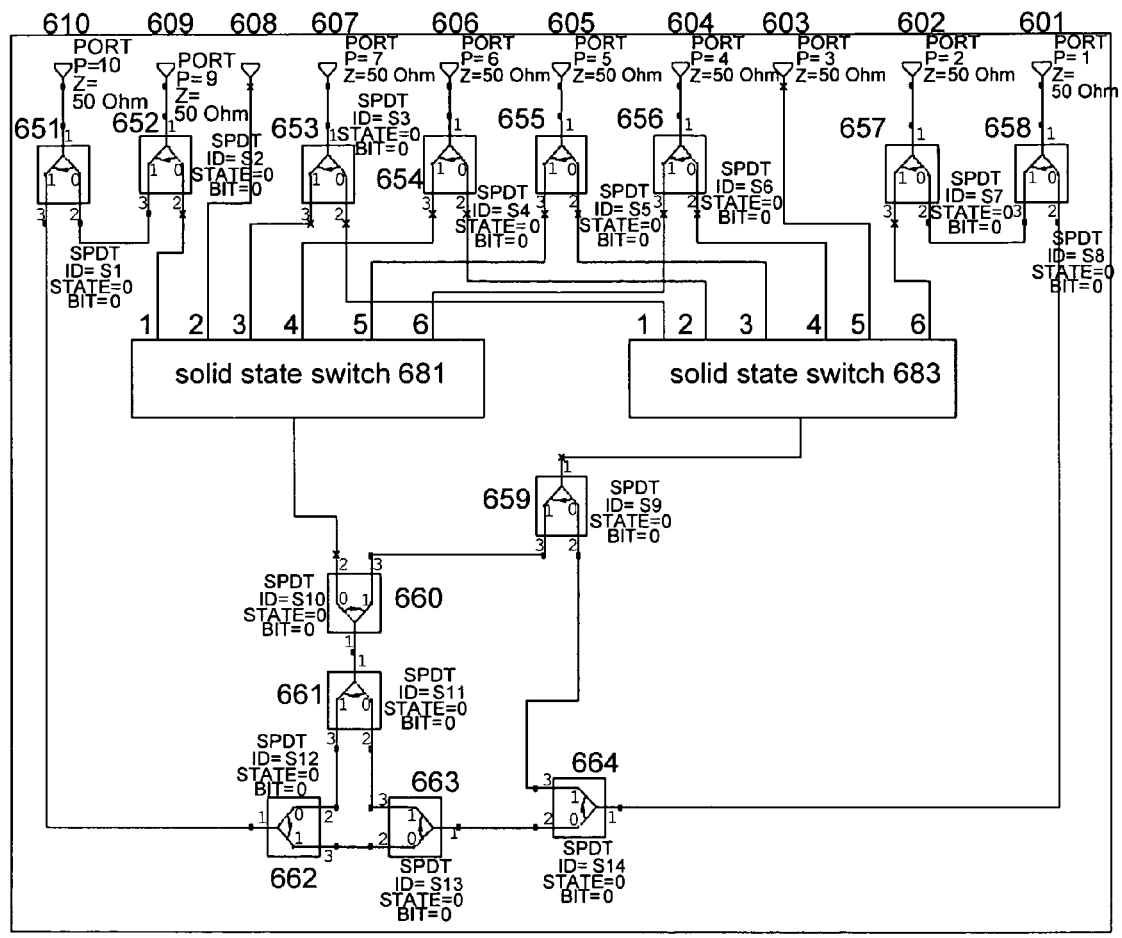
FIG. 6 is diagrammatic representation showing a switch module having 10 line cards.

FIG. 6 is a diagrammatic representation of a switch module coupled to the pass module of FIG. 5. Interfaces 601-610 allow connection of the switch module to the pass module. The switch module includes relays 651-664 to allow a cable line to be switched from a failed line card to a redundant line card. Although the switch module can be implemented entirely using relays, a substantial number of relatively large relays would have to be used and would make up-ward scaleability next to impossible. Consequently, the techniques and mechanisms of the present invention recognize that solid state switches 681 and 683 can be used with relays allow still relatively lossless transmission, high isolation while maintaining flexibility and scalability. As the number of line cards increases, the number of solid state switches needed in the switch module increases linearly. If solid state switches were not used, the number of relays required would grow far more rapidly. The solid state switch 681 allows RF signals to be directed toward particular ports. Although the solid state switch 681 may introduce some distortion, only minimum distortion is introduced as only minimal distortion results from solid state switches 681 or 683 for any given path between a cable line and a line card. The following Table 2 shows switch positions for various relays depending upon redundancy group and card failures.

TABLE 2

Relay Positions For Switch Module

| Switch Module | | Sw 651 | Sw 652 | Sw 653 | Sw 654 | Sw 655 | Sw 656 | Sw 657 | Sw 658 | Sw 659 | Sw 660 | Sw 661 | Sw 662 | Sw 663 | Sw 664 | Sw 681 | Sw 683 |
|---|---|---|---|---|---|---|---|---|---|---|---|---|---|---|---|---|---|
| Redundant Group 10 working cards | | | | | | | | | | | | | | | | | |
| 1P + 9, | Card 2 fail | 3 | | | | | | | 2 | | | | 3 | 2 | 2 | | |
| | Card 3 fail | | | | | | | 2 | 3 | | | | | | | | |
| | Card 4 fail | | | | | | | | 2 | 2 | | | | | 3 | | 5 |
| | Card 5 fail | | | | | | 2 | | 2 | 2 | | | | | 3 | | 4 |
| | Card 6 fail | | | | | 2 | | | 2 | 2 | | | | | 3 | | 3 |
| | Card 7 fail | | | | 2 | | | | 2 | 2 | | | | | 3 | | 2 |
| | Card 8 fail | | | 2 | | | | | 2 | 2 | | | | | 3 | | 1 |
| | Card 9 fail | | | | | | | | 2 | | 2 | 2 | | 3 | 2 | 2 | |
| | Card 10 fail | | 2 | | | | | | 2 | | 2 | 2 | | 3 | 2 | 1 | |
| 1P + 7, 2P + 1 | Card 3 fail (1P) | | | | | | | 2 | 3 | | | | | | | | |
| | Card 4 fail (1P) | | | | | | | | 2 | 2 | | | | | 3 | | 5 |

TABLE 2-continued

Relay Positions For Switch Module

| Switch Module | | Sw | Sw | Sw | Sw | Sw | Sw | Sw | Sw | Sw | Sw | Sw | Sw | Sw | Sw | Sw |
|---|---|---|---|---|---|---|---|---|---|---|---|---|---|---|---|---|
| | Card 5 fail (1P) | | | | | | 2 | | 2 | 2 | | | | 3 | | 4 |
| | Card 6 fail (1P) | | | | | 2 | | | 2 | 2 | | | | 3 | | 3 |
| | Card 7 fail (1P) | | | | 2 | | | | 2 | 2 | | | | 3 | | 2 |
| | Card 8 fail (1P) | | | 2 | | | | | 2 | 2 | | | | 3 | | 1 |
| | Card 9 fail (1P) | | | | | | | | 2 | | 2 | 2 | | 3 | 2 | 2 |
| | Card 10 fail (2P) | 2 | 3 | | | | | | | | | | | | | |
| 1P + 6, 2P + 2 | Card 3 fail (1P) | | | | | | | 2 | 3 | | | | | | | |
| | Card 4 fail (1P) | | | | | | | | 2 | 2 | | | | 3 | | 5 |
| | Card 5 fail (1P) | | | | | | 2 | | 2 | 2 | | | | 3 | | 4 |
| | Card 6 fail (1P) | | | | | 2 | | | 2 | 2 | | | | 3 | | 3 |
| | Card 7 fail (1P) | | | | 2 | | | | 2 | 2 | | | | 3 | | 2 |
| | Card 8 fail (1P) | | | 2 | | | | | 2 | 2 | | | | 3 | | 1 |
| | Card 9 fail (2P) | 3 | | | | | | | | | 2 | 3 | 2 | | 2 | |
| | Card 10 fail (2P) | 2 | 3 | | | | | | | | | | | | | |
| 1P + 5, 2P + 3 | Card 3 fail (1P) | | | | | | | 2 | 3 | | | | | | | |
| | Card 4 fail (1P) | | | | | | | | 2 | 2 | | | | 3 | | 5 |
| | Card 5 fail (1P) | | | | | | 2 | | 2 | 2 | | | | 3 | | 4 |
| | Card 6 fail (1P) | | | | | 2 | | | 2 | 2 | | | | 3 | | 3 |
| | Card 7 fail (1P) | | | | 2 | | | | 2 | 2 | | | | 3 | | 2 |
| | Card 8 fail (2P) | 3 | | 3 | | | | | | | 2 | 3 | 2 | | 3 | |
| | Card 9 fail (2P) | 3 | | | | | | | | | 2 | 3 | 2 | | 2 | |
| | Card 10 fail (2P) | 2 | 3 | | | | | | | | | | | | | |
| 1P + 4, 2P + 4 | Card 3 fail (1P) | | | | | | | 2 | 3 | | | | | | | |
| | Card 4 fail (1P) | | | | | | | | 2 | 2 | | | | 3 | | 5 |
| | Card 5 fail (1P) | | | | | | 2 | | 2 | 2 | | | | 3 | | 4 |
| | Card 6 fail (1P) | | | | | 2 | | | 2 | 2 | | | | 3 | | 3 |
| | Card 7 fail (2P) | 3 | | | 3 | | | | | | 2 | 3 | 2 | | 4 | |
| | Card 8 fail (2P) | 3 | | 3 | | | | | | | 2 | 3 | 2 | | 3 | |
| | Card 9 fail (2P) | 3 | | | | | | | | | 2 | 3 | 2 | | 2 | |
| | Card 10 fail (2P) | 2 | 3 | | | | | | | | | | | | | |
| 1P + 3, 2P + 5 | Card 3 fail (1P) | | | | | | | 2 | 3 | | | | | | | |
| | Card 4 fail (1P) | | | | | | | | 2 | 2 | | | | 3 | | 5 |
| | Card 5 fail (1P) | | | | | | 2 | | 2 | 2 | | | | 3 | | 4 |
| | Card 6 fail (2P) | 3 | | | | 3 | | | | | 2 | 3 | 2 | | 5 | |
| | Card 7 fail (2P) | 3 | | | 3 | | | | | | 2 | 3 | 2 | | 4 | |
| | Card 8 fail (2P) | 3 | | 3 | | | | | | | 2 | 3 | 2 | | 3 | |
| | Card 9 fail (2P) | 3 | | | | | | | | | 2 | 3 | 2 | | 2 | |

TABLE 2-continued

Relay Positions For Switch Module

| Switch Module | | Sw | Sw | Sw | Sw | Sw | Sw | Sw | Sw | Sw | Sw | Sw | Sw | Sw | Sw | Sw |
|---|---|---|---|---|---|---|---|---|---|---|---|---|---|---|---|---|
| | Card 10 fail (2P) | 2 | 3 | | | | | | | | | | | | | |
| 1P + 2, 2P + 6 | Card 3 fail (1P) | | | | | | | 2 | 3 | | | | | | | |
| | Card 4 fail (1P) | | | | | | | 2 | 2 | | | | | 3 | | 5 |
| | Card 5 fail (2P) | 3 | | | | | 3 | | | | 2 | 3 | 2 | | 6 | |
| | Card 6 fail (2P) | 3 | | | | 3 | | | | | 2 | 3 | 2 | | 5 | |
| | Card 7 fail (2P) | 3 | | | 3 | | | | | | 2 | 3 | 2 | | 4 | |
| | Card 8 fail (2P) | 3 | | 3 | | | | | | | 2 | 3 | 2 | | 3 | |
| | Card 9 fail (2P) | 3 | | | | | | | | | 2 | 3 | 2 | | 2 | |
| | Card 10 fail (2P) | 2 | 3 | | | | | | | | | | | | | |
| 1P + 1, 2P + 7 | Card 3 fail (1P) | | | | | | | 2 | 3 | | | | | | | |
| | Card 4 fail (2P) | 3 | | | | | | | | 3 | 3 | 3 | 2 | | | 5 |
| | Card 5 fail (2P) | 3 | | | | | 3 | | | | 2 | 3 | 2 | | 6 | |
| | Card 6 fail (2P) | 3 | | | | 3 | | | | | 2 | 3 | 2 | | 5 | |
| | Card 7 fail (2P) | 3 | | | 3 | | | | | | 2 | 3 | 2 | | 4 | |
| | Card 8 fail (2P) | 3 | | 3 | | | | | | | 2 | 3 | 2 | | 3 | |
| | Card 9 fail (2P) | 3 | | | | | | | | | 2 | 3 | 2 | | 2 | |
| | Card 10 fail (2P) | 2 | 3 | | | | | | | | | | | | | |
| 2P + 9 | Card 1 fail (2P) | 3 | | | | | | | 2 | | | | 3 | 2 | 2 | |
| | Card 3 fail (2P) | 3 | | | | | | 3 | | 3 | 3 | 3 | 2 | | | 6 |
| | Card 4 fail (2P) | 3 | | | | | | | | 3 | 3 | 3 | 2 | | | 5 |
| | Card 5 fail (2P) | 3 | | | | | 3 | | | | 2 | 3 | 2 | | 6 | |
| | Card 6 fail (2P) | 3 | | | | 3 | | | | | 2 | 3 | 2 | | 5 | |
| | Card 7 fail (2P) | 3 | | | 3 | | | | | | 2 | 3 | 2 | | 4 | |
| | Card 8 fail (2P) | 3 | | 3 | | | | | | | 2 | 3 | 2 | | 3 | |
| | Card 9 fail (2P) | 3 | | | | | | | | | 2 | 3 | 2 | | 2 | |
| | Card 10 fail (2P) | 2 | 3 | | | | | | | | | | | | | |

Figure 7:
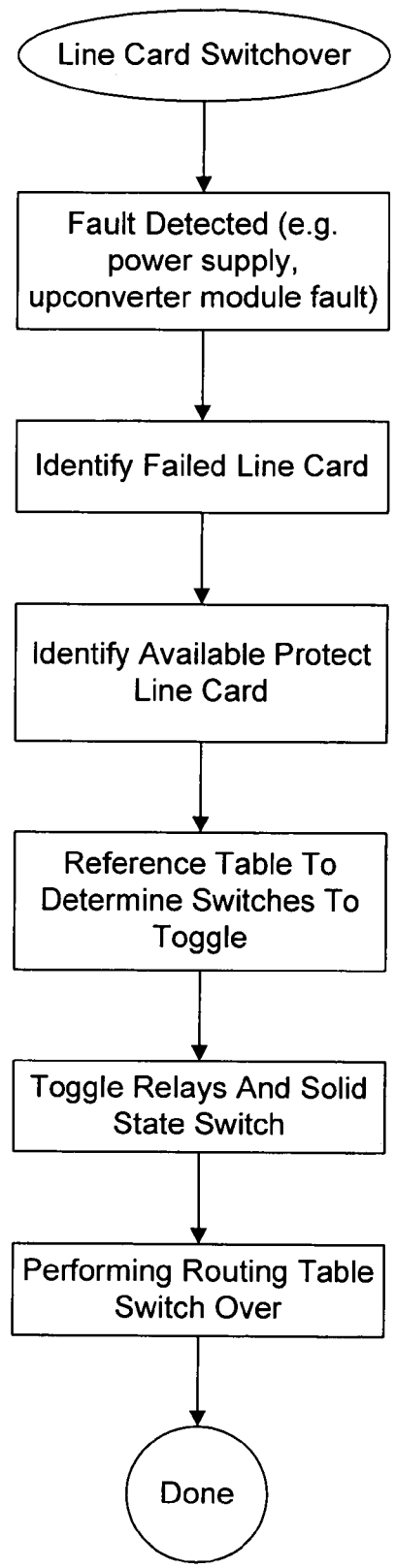
FIG. 7 is a flow process diagram depicting failover.

FIG. 7 is a flow process diagram showing one mechanism that can be used to switch a cable line from an active line card to a redundant line card. At 701, a line card fault is detected. Line card faults are typically detected by the cable network headend operating system. However, hardware mechanisms performing heartbeat checks on linecards can also be used. In some examples, line card failures result from the failure of the line card power supply, or the failure of the line card upconverter module. At 703, the line card redundancy module control circuitry identifies the failed line card. At 705, it is determined if there is an available protect line card. At 707, a table or other data storage mechanisms is referenced to determine switches to toggle. In many instances, the table will resemble Table 1 and Table 2. At 709, any relays and solid state devices are switched. At 711, routing table switchover is performed.

The techniques of the present invention implementing line card switch over can be implemented in a variety of network systems. According to various embodiments, a redundancy switch can be implemented in the headend of high bandwidth networks such as a cable network or a satellite network. In the context of a cable network, the invention is implemented in a cable network headend such as the Cisco UBR TBD (3G router) available from Cisco Systems, Inc.

Figure 8:
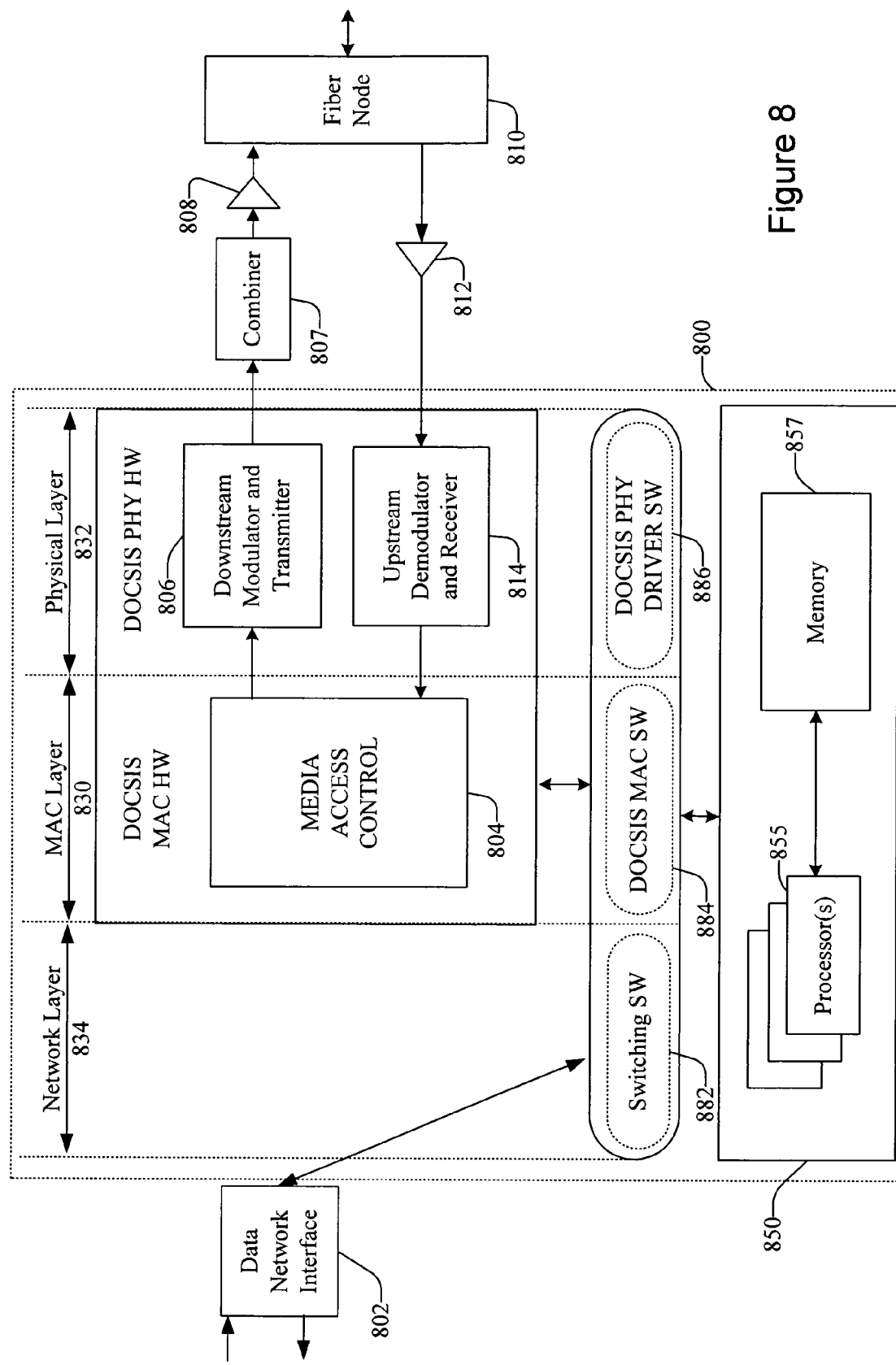
FIG. 8 is a diagrammatic representation of a system that can be used to implement the present invention.

FIG. 8 depicts the basic components of a cable network headend that can be used to implement the present invention, according to specific embodiments. Although the techniques of the present invention can be integrated into a cable network headend, the present invention can also be used in a standalone system. FIG. 8 shows an implementation using the cable network headend.

A Data Network Interface 802 is an interface component between an external data source and the cable system. External data sources transmit data to data network interface 802 via optical fiber, microwave link, satellite link, or through various other media. Also as mentioned above, a Media Access Control Block (MAC Block) 804 receives data packets from a Data Network Interface 802 and encapsulates them with a MAC header.

In a specific embodiment as shown in FIG. 8, CMTS provides functions on three network layers including a physical layer 832, a Media Access Control (MAC) layer 830, and a network layer 834. Generally, the physical layer is responsible for receiving and transmitting RF signals on the cable plant. Hardware portions of the physical layer include a downstream modulator and transmitter 806 and an upstream demodulator and receiver 814. The physical layer also includes software 886 for driving the hardware components of the physical layer.

Once an information packet is demodulated by the demodulator/receiver 814, it is then passed to MAC layer 830. A primary purpose of MAC layer 830 is to encapsulate and decapsulate packets within a MAC header, preferably according to the above-mentioned DOCSIS standard for transmission of data or other information.

MAC layer 830 includes a MAC hardware portion 804 and a MAC software portion 884, which function together to encapsulate information packets with the appropriate MAC address of the cable modem(s) on the system. After the upstream information has been processed by MAC layer 830, it is then passed to network layer 834. Network layer 834 includes switching software 882 for causing the upstream information packet to be switched to an appropriate data network interface on data network interface 802.

When a packet is received at the data network interface 802 from an external source, the switching software within network layer 834 passes the packet to MAC layer 830. MAC block 804 transmits information via a one-way communication medium to downstream modulator and transmitter 806. Downstream modulator and transmitter 806 takes the data (or other information) in a packet structure and converts it to modulated downstream frames, such as MPEG or ATM frames, on the downstream carrier using, for example, QAM modulation (other methods of modulation can be used such as CDMA (Code Division Multiple Access) OFDM (Orthogonal Frequency Division Multiplexing), FSK (FREQ Shift Keying)). The return data is likewise modulated using, for example, QAM 16 or QSPK. Data from other services (e.g. television) is added at a combiner 807. Converter 808 converts the modulated RF electrical signals to optical signals that can be received and transmitted by a Fiber Node 810 to the cable modem hub.

It is to be noted that alternate embodiments of the CMTS (not shown) may not include network layer 834. In such embodiments, a CMTS device may include only a physical layer and a MAC layer, which are responsible for modifying a packet according to the appropriate standard for transmission of information over a cable modem network. The network layer 834 of these alternate embodiments of CMTS devices may be included, for example, as part of a conventional router for a packet-switched network.

In a specific embodiment, the network layer of the CMTS is configured as a cable line card coupled to a standard router that includes the physical layer 832 and MAC layer 830. The cable line card may be a part of a line card redundancy module. Using this type of configuration, the CMTS is able to send and/or receive IP packets to and from the data network interface 802 using switching software block 882. The data network interface 802 is an interface component between external data sources and the cable system. The external data sources transmit data to the data network interface 802 via, for example, optical fiber, microwave link, satellite link, or through various media. The data network interface includes hardware and software for interfacing to various networks such as, for example, Ethernet, ATM, frame relay, etc.

As shown in FIG. 8, the CMTS includes a hardware block 850 including one or more processors 855 and memory 857. These hardware components interact with software and other hardware portions of the various layers within the CMTS. Memory 857 may include, for example, I/O memory (e.g. buffers), program memory, shared memory, etc. Hardware block 850 may physically reside with the other CMTS components.

In one embodiment, the software entities 882, 884, and 886 are implemented as part of a network operating system running on hardware 850. The network operating system may be used to monitor the activity of the various line cards.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of communication protocols and should not be restricted to the ones mentioned above. For example, the headend has a variety of embodiments which include a cable modem termination system coupled to a router or a multicast router. A cable modem can also be a separate entity or entirely integrated into a client system. In addition and as mentioned above, the invention may be implemented in both differential and single-ended configurations. Therefore, the scope of the invention should be determined with reference to the appended claims.

What is claimed is:

1. A cable network headend, comprising:
a pass module coupled to a plurality of active line cards and a plurality of active cable network ports, the pass module configured to connect the plurality of active line cards to the plurality of active cable network ports by using a plurality of pass module electromechanical switches;
a switch module comprising a plurality of switch module electromechanical switches and a solid state switching mechanism, wherein only a single solid state switch is used for any given path between a line card and a cable network port, the switch module associated with control circuitry and coupled to the pass module, wherein a cable network headend operating system monitors the plurality of active line cards and responds to line card failure information by switching one of the plurality of active cable network ports to a redundant line card through the pass module.

2. The cable network headend of claim 1, wherein the pass module is coupled to a plurality of redundant line cards.

3. The cable network headend of claim 2, wherein each of the plurality of redundant line cards is operable to protect a subset of the active line cards.

4. The cable network headend of claim 2, wherein each of the plurality of redundant line cards is operable to protect all of the active line cards.

5. The cable network headend of claim 2, wherein each of the plurality of redundant line cards is operable to protect particular services.

6. The cable network headend of claim 1, wherein the control circuitry references a data structure to determine which of the plurality of electromechanical switches to toggle in order to switch one of the plurality of active cable network ports to the redundant line card.

7. The cable network headend of claim 1, wherein the cable network headend is a cable modem network headend.

8. The cable network headend of claim 1, wherein each of the plurality of active cable network ports is coupled to a cable plant.

9. The cable network headend of claim 1, wherein the plurality of line cards include upstream and downstream linecards.

10. A method, comprising:
coupling a plurality of active line cards to a plurality of active cable network ports by using a plurality of electromechanical switches at a cable network headend;
monitoring for failure of one of the plurality of active line cards, wherein monitoring is performed by a cable network headend operating system;
switching one of the plurality of active cable network ports to a protect line card upon detecting failure, wherein one of the plurality of active cable network ports is switched to the protect line card through electromechanical switches and a solid state switching mechanism, wherein only a single solid state switch is used for any given path between a line card and a cable network port.

11. The method of claim 10, wherein the cable network headend comprises a plurality of protect line cards.

12. The method of claim 11, wherein each of the plurality of protect line cards is operable to protect a subset of the plurality of active line cards.

13. The method of claim 11, wherein each of the plurality of protect line cards is operable to protect all of the active line cards.

14. The method of claim 11, wherein each of the plurality of protect line cards is operable to protect particular services.

15. The method of claim 10, wherein a data structure is referenced to determine which of the plurality of electromechanical switches to toggle in order to switch one of the plurality of active cable network ports to the protect line card.

16. The method of claim 10, wherein the cable network headend is a cable modem termination system.

17. The method of claim 10, wherein each of the plurality of active cable network ports is coupled to a cable plant.

18. The method of claim 10, wherein the plurality of line cards include upstream and downstream linecards.

19. A cable network headend, comprising:
means for coupling a plurality of active line cards to a plurality of active cable network ports by using a plurality of electromechanical switches at a cable network headend;
means for monitoring for failure of one of the plurality of active line cards, wherein monitoring is performed by a cable network headend operating system;
means for switching one of the plurality of active cable network ports to a protect line card upon detecting failure, wherein one of the plurality of active cable network ports is switched to the protect line card through electromechanical switches and a solid state switching mechanism, wherein only a single solid state switch is used for any given path between a line card and a cable network port.

20. The cable network headend of claim 19, wherein the cable network headend comprises a plurality of protect line cards.

21. The cable network headend of claim 20, wherein each of the plurality of protect line cards is operable to protect a subset of the plurality of active line cards.

22. The cable network headend of claim 20, wherein each of the plurality of protect line cards is operable to protect all of the active line cards.

23. The cable network headend of claim 20, wherein each of the plurality of protect line cards is operable to protect particular services.

24. The cable network headend of claim 19, wherein a data structure is referenced to determine which of the plurality of electromechanical switches to toggle in order to switch one of the plurality of active cable network ports to the protect line card.

25. The cable network headend of claim 19, wherein the cable network headend is a cable modem termination system.

26. The cable network headend of claim 19, wherein each of the plurality of the active cable network ports is coupled to a cable plant.

27. The cable network headend of claim 19, wherein the plurality of line cards include upstream and downstream line cards.

* * * * *

UNITED STATES PATENT AND TRADEMARK OFFICE
CERTIFICATE OF CORRECTION

PATENT NO. : 7,599,285 B2  Page 1 of 1
APPLICATION NO. : 10/701405
DATED : October 6, 2009
INVENTOR(S) : Zhou et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1392 days.

Signed and Sealed this

Twenty-eighth Day of September, 2010

David J. Kappos
*Director of the United States Patent and Trademark Office*